UNITED STATES PATENT OFFICE.

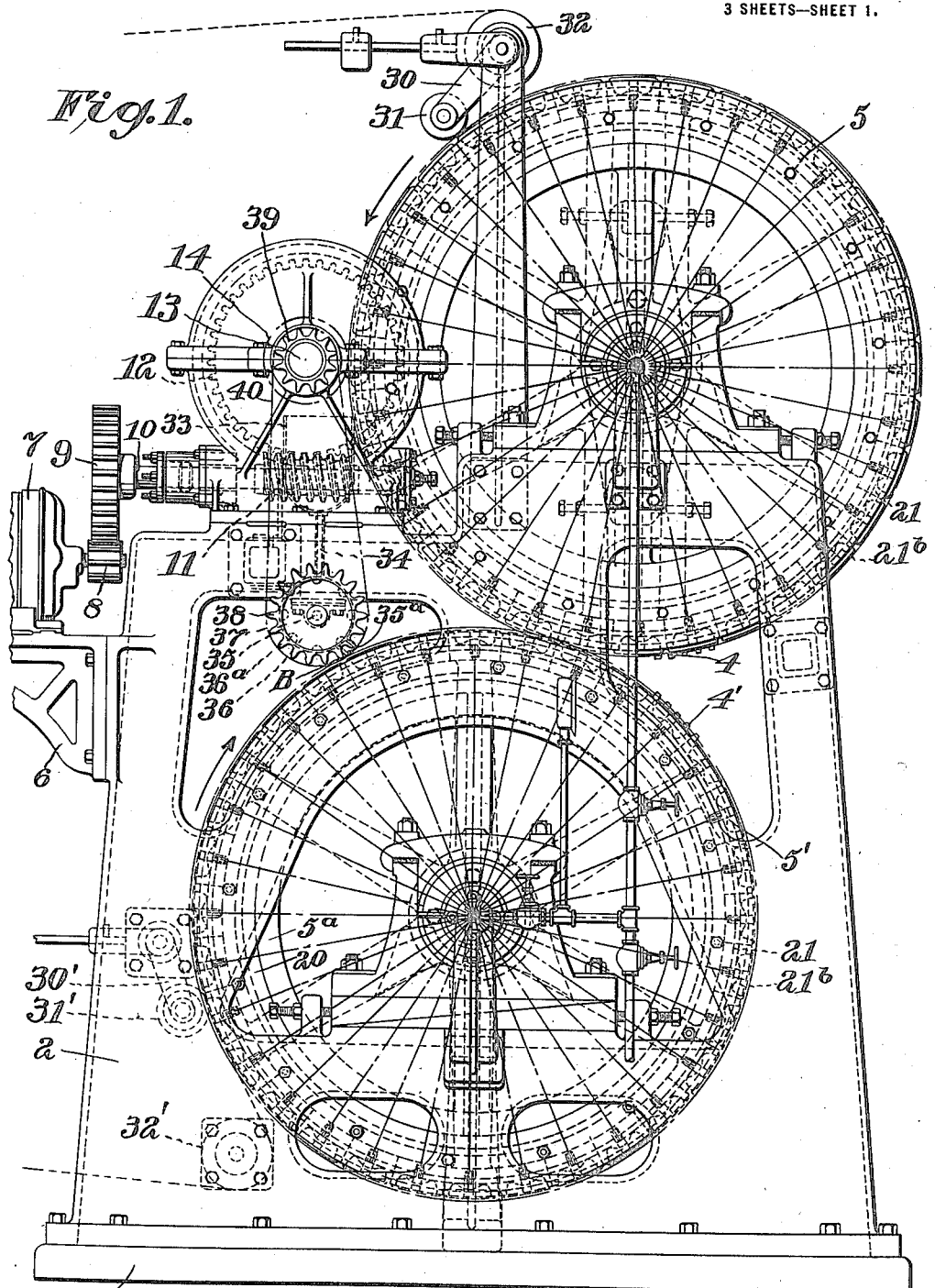

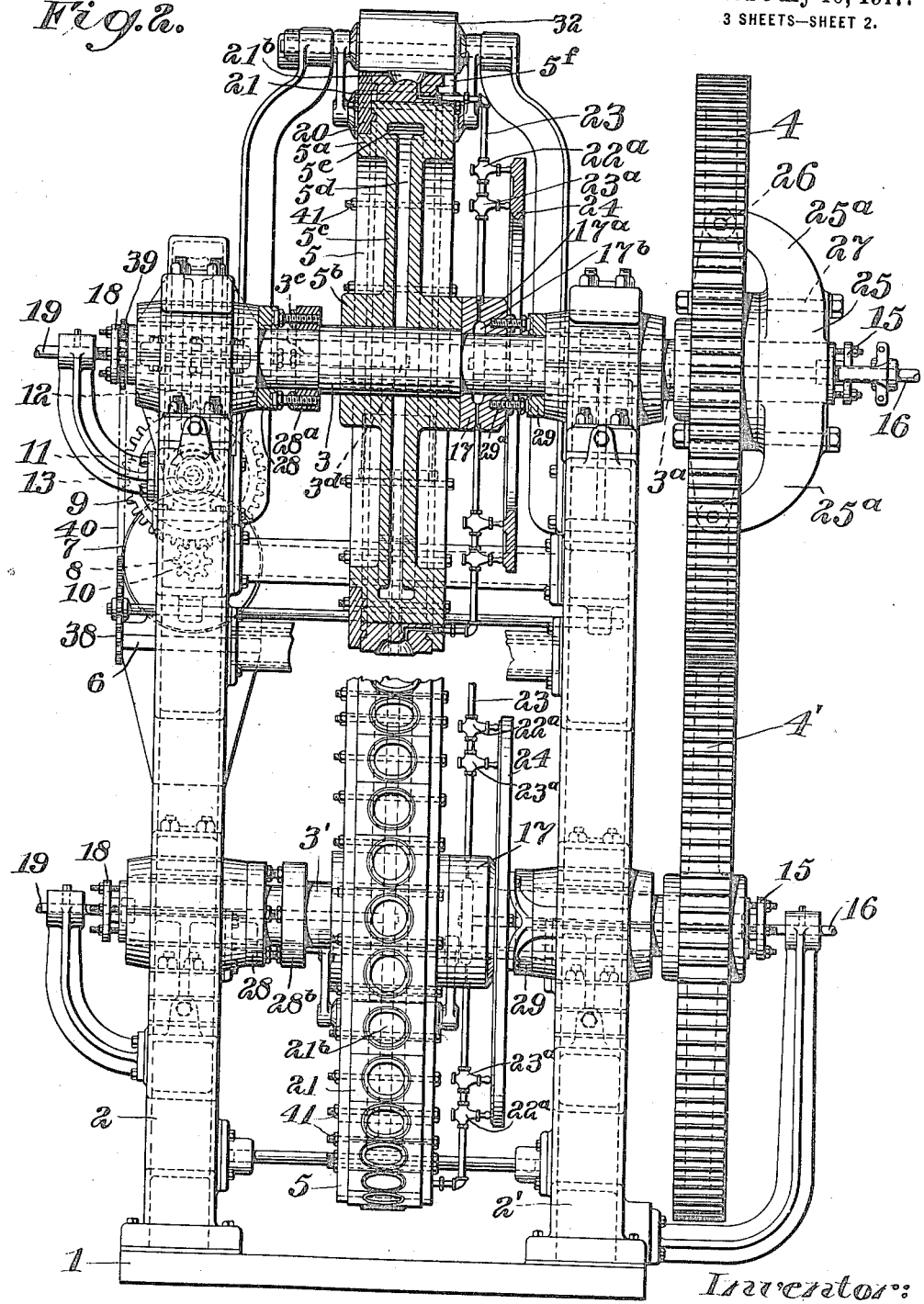

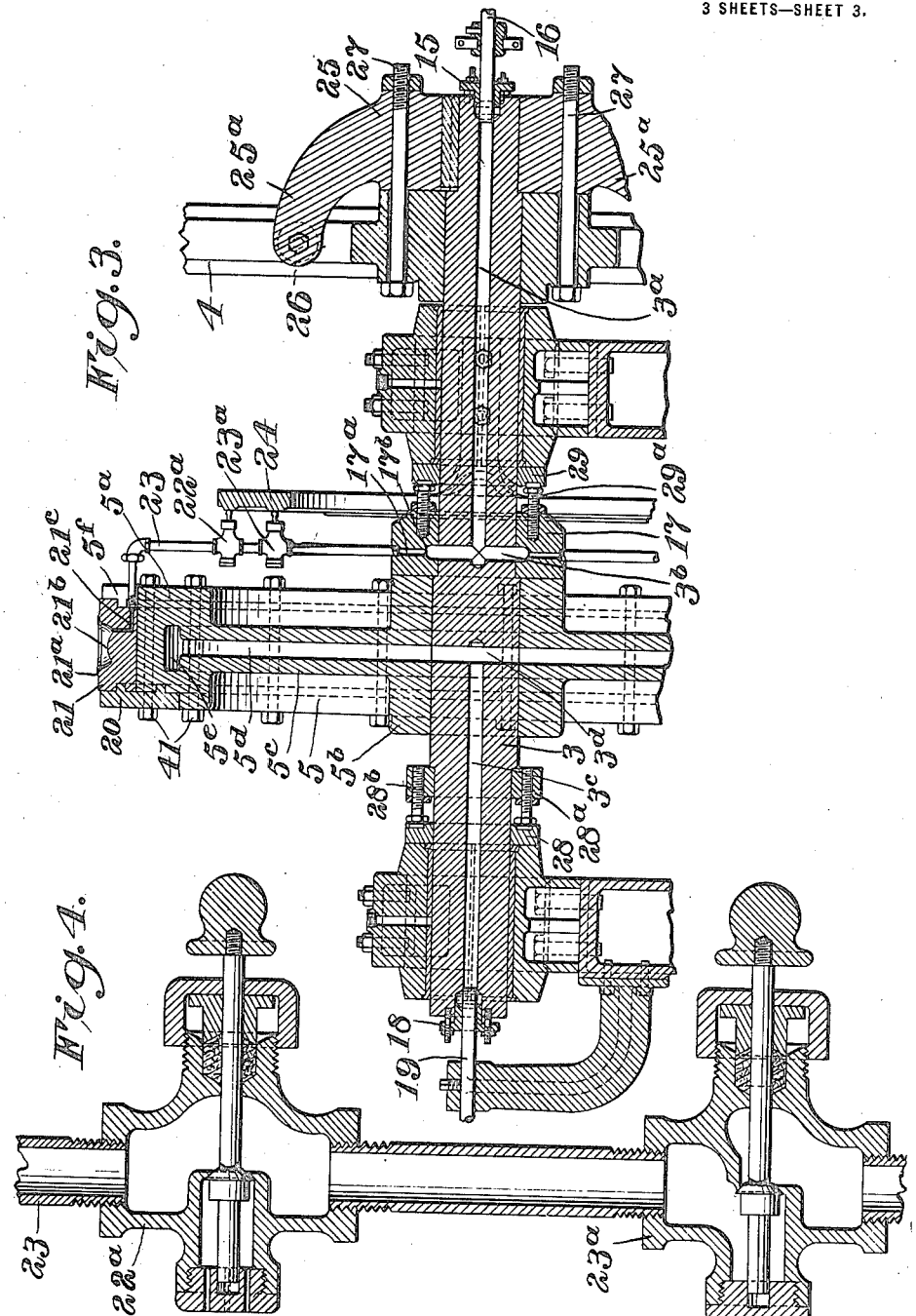

JAMES W. BRUNDAGE, OF AKRON, OHIO, ASSIGNOR TO THE MILLER RUBBER COMPANY, OF AKRON, OHIO, A CORPORATION OF OHIO.

APPARATUS FOR MANUFACTURE OF HOLLOW RUBBER ARTICLES.

1,232,764.   Specification of Letters Patent.   Patented July 10, 1917.

Application filed April 28, 1917. Serial No. 165,227.

*To all whom it may concern:*

Be it known that JAMES W. BRUNDAGE, a citizen of the United States, and resident of Akron, Ohio, have invented certain new and useful Improvements in Apparatus for Manufacture of Hollow Rubber Articles, of which the following is a specification.

My present invention relates to improvements in machines or apparatus for manufacturing hollow articles from plastic material.

I have aimed to produce an apparatus which shall be simple in form and economical of construction, which will be continuous in its action, which will produce the articles with extreme rapidity, and which will require but a minimum amount of hand labor or attention.

With these, and other objects in view as will hereinafter appear, the invention includes the novel features of construction and arrangement and combination of parts as defined by the appended claims.

In the accompanying drawings I have, for convenience, illustrated but a single form of my invention, having chosen for this purpose a machine for the manufacture of hollow playing balls of rubber, but it will be obvious that my invention is not limited to this specific article or material.

In the said drawings

Figure 1 is a side elevation of the machine, with parts omitted for clearness of illustration.

Fig. 2 is a sectional elevation.

Fig. 3 is an enlarged sectional view, the section being taken vertically through the axis of the shaft of the upper drum or wheel, and Fig. 4 is an enlarged detail of the valve mechanism.

Referring by reference characters to this drawing, the numeral 1 designates a base plate, upon which are mounted frame members, 2, 2', designed to carry bearings for two main shafts 3, 3', said shafts being provided with equal gears 4, 4', and wheels or drums 5, 5', carrying peripherally arranged mating mold cavities as hereinafter described. One of these drums (5) is arranged above the other and offset from the vertical plane passing through the axis of the lower drum as shown in Fig. 1.

Frame 2 is also provided with bracket 6 for supporting an electric motor 7, and suitable gearing is provided for delivering the power from said motor to the drum 5. This gearing preferably comprises a pinion 8 mounted on the motor shaft and meshing with a gear 9, mounted upon a shaft 10, carrying a worm 11, meshing with a worm wheel 12, mounted upon a shaft 13, which also carries a pinion 14, which meshes with gear 4. Gear 4 also transmits power to gear 4', whereby the two drums 5, 5' are driven at uniform velocities.

Referring now to Fig. 3, which is a part sectional view of drum 5 and its supporting shaft on a larger scale, said shaft 3 is provided with a longitudinal passage $3^a$ and lateral passages $3^b$. The passage $3^a$ terminates at the outer end of the shaft 3 in a stuffing box 15 embracing a pipe 16, which extends from the machine to a vacuum pump, not shown. Shaft 3 carries a collar 17 adjacent to the drum 5 and provided with a number of radially extending openings, or passages, $17^a$, and an internal annular groove $17^b$ serving to establish communication between passages $17^a$ and passage $3^a$ in the shaft. Shaft 3 is also provided with a longitudinal passage $3^c$ extending from the opposite end of the shaft to a point mid-way between the ends of the drum 5 connecting with a cross passage $3^d$ at the center of the drum. The passage $3^c$ is provided at its outer end with a stuffing box 18 and a pipe 19 suitably connected to a source for supplying a heating medium such as steam (not shown). The drum 5 preferably comprises a rim $5^a$ and a hub $5^b$ connected by spokes $5^c$. Some of the spokes, two for example, contain passages $5^d$ connecting with passage ways $3^d$ in the shaft 3 at their inner extremities and with an annular passageway or chamber $5^e$ at their other extremities, said passageway $5^e$ extending completely around the drum 5, approximately centrally of the rim $5^a$. This rim $5^a$ is formed with a flange $5^f$ extending radially from one edge and a counterpart flange 20 is detachably connected to the opposite edge of the rim $5^a$ by means of bolts 41 passing through the rim $5^a$. Mounted upon the rim $5^a$ of the drum 5 are a plurality of single cavity molds 21 provided with cutting and pressing edges $21^a$, cavities $21^b$ and suction or vacuum openings, or passages $21^c$. These passages $21^c$ are connected by suitable pipes to release valves $22^a$ and vacuum valves $23^a$, which are in turn connected by pipes 23 with openings, or passages 17ª in the collar 17. Valves 22ª and 23ª are shown in detail in Fig. 4, and are for the purpose of regulating flow of air to or from the cavities 21ᵇ of the mold blocks 21. Mounted in proximity to the valves 22ª and 23ª, of which there is one pair for each mold block 21, is a fixed annular ring cam 24, which is suitably supported from the frame member 2'. The face of ring cam 24 is so formed as to open and close the valves 22ª and 23ª at predetermined intervals during the rotation of the drum 5. The drum 5' is similarly constructed and the foregoing description of drum 5 applies equally to the drum 5'. These drums 5, 5' are rigidly mounted on the shafts 3, 3' and the gear 4' is rigidly mounted upon the shaft 3', but the gear 4 is freely mounted upon the shaft 3. Adjacent to the gear 4 on shaft 3 is mounted a keyed collar, 25, carrying a pair of spaced lugs 25ª on diametrically opposite sides, said lugs being disposed so that each pair straddles one of the spokes of the gear 4, said spoke being adjustably secured between lugs 25ª by means of set screws 26. Collar 5 is also provided with bolts 27, by which the gear 4 may be locked thereto after being adjusted by means of set screws 26, said bolts passing through elongated openings in the hub. It is necessary that the drums 5, 5' be so disposed about the shafts 3, 3' that the cavities 21ᵇ of the drum 5 will coincide with the cavities 21ᵇ of the drum 5' when said drums are rotated together and the collar 25 and set screws 26, just described, are for the purpose of alining the cavities circumferentially of the shafts 3, 3'. For alining the cavities longitudinally of the shafts 3, 3', adjusting collars 28 and 28ª are used on one side, collar 28 abutting against the shaft bearing and collar 28ª against a shoulder on the shaft, the adjustment being effected by screws 28ᵇ, and a similar collar 29 cooperating with the other shaft bearing under the action of screws 29ª threaded into recesses in collar 17.

A swing bracket 30 is mounted upon the frame 2, 2' and carries an idle roll 31 which bears on the cutting edges 21ª of the mold blocks 21 mounted on the drum 5. Also idly mounted upon the shaft on which bracket 30 swings is an idle roll 32. In like manner a bracket 30', swing roll 31' and an idle roll 32' will be seen mounted at the rear of drum 5'. The drums 5, 5' are rotated in the direction indicated by the arrows, and two strips, or sheets, of uncured rubber gum are fed from a suitable source of supply (not shown) as indicated by the dotted lines. These sheets first pass around the idle rolls 32, 32' and then between the drums 5, 5', and the swing rolls 31, 31' by means of which the rubber is secured by adhesion to the cutting edges 21ª of the mold blocks 21 carried by the drums 5, 5'. The mold blocks 21 are preferably made of hard steel to which the rubber will adhere, whereas the idle rolls 31, 31' and 32, 32' are preferably covered with cloth or other substance to which the rubber will not adhere.

In the operation of the machine, as the rubber passes under the rolls 31, 31', the cam ring 24 depresses the stem of the vacuum valves 23ª, thereby causing suction to be applied to the cavities 21ᵇ, thereby drawing the sheets of rubber down into the cavities 21ᵇ. The cavities 21ᵇ may be of any shape desired, but preferably of the shape shown in these drawings, as by this construction the rubber will bottom in the center before it bottoms near the edges of the cavities, thereby preventing thinning of the stock at the center of the cavity. The cavities in the drum 5' then pass to a point B. At this point a pill of chemical material, which will gasify under vulcanizing heat, is automatically dropped into each cavity. The cavities then pass on until the cutting and pressing edges 21ª on one drum meet the counterpart edges of the other drum, whereby the two sheets of material are forced together at the edges of the cavities and severed from the remaining stock. At this point the vacuum valve 23ª of each cavity is released, shutting off the vacuum from that cavity and at the same time the release valve 22ª is depressed by the cam ring 24, allowing atmospheric pressure to take the place of the vacuum in cavity 21ᵇ, so that as the cavities pass on from this point the finished rubber articles will remain in the cavities of the drum 5' until they reach a point at which they will be freed by their own weight. The waste material may be fed from the drums 5, 5' by any suitable mechanism, such as a pair of pulling rolls, not shown, or by a hand. The mechanism used to drop the pills of chemical material comprises a receptacle 33 having a spherical bottom and adapted to contain a quantity of pills, or pellets, which receptacle is connected by a pipe 34 at its lower extremity to a circular casing 35 containing a disk 36 mounted on a shaft 37 in the casing 35. The disk 36 is provided with a number of pockets 36ª, each pocket being of suitable size to contain one pill only. An orifice 35ª in the lower part of the casing 35 is adapted to register with the pockets 36ª as they pass said orifice. Mounted upon the shaft 37 which carries the disk 36 is a sprocket wheel 38, and this sprocket wheel is connected with a second sprocket wheel 39 mounted on shaft 13 by a chain 40. By means of sprockets 38 and 39 and chain 40, the disk 36 is revolved at such a speed that one of the pockets 36ª will coincide with the orifice 35ª at each time that a cavity 21ᵇ on a drum 5' passes beneath the said orifice 35ª.

The articles as produced by this machine are then ready to be placed in ordinary curing molds, whereby the articles are vulcanized after they leave the machine. In the process of vulcanization the chemicals formed in the pill in the center of each article will form gases which expand the article to fit the curing mold.

The admission of steam, or other heating fluid, to the interior of the rim serves to heat the same sufficiently to facilitate the working of the rubber sheets.

What I claim is:—

1. Apparatus for manufacturing hollow plastic articles comprising a pair of rotary carrier members having mating mold cavities, means for feeding plastic sheet material in duplicate between said mold sections, and means for producing suction in said mold cavities while they are in opposition to draw the sheets into the respective cavities.

2. Apparatus for manufacturing hollow plastic articles comprising a pair of rotary co-acting carrier members having mating mold cavities, means for feeding a pair of sheets between said members, said mold cavities having edges constructed and adapted to sever blanks from said sheets and press the severed edges of the blanks together, and means for producing suction within the mold cavities to draw the blanks into the cavities.

3. Apparatus for manufacturing hollow plastic articles comprising a pair of rotary carrier members having mating mold cavities provided with cutting edges, means for feeding a pair of sheets of plastic material to said rotary members, presser rolls for pressing said sheets against the cutting edges prior to the mating of the cavities, and means for producing suction within the cavities to draw the portions of the sheets within said cutting edges into the cavities.

4. Apparatus for manufacturing hollow plastic articles comprising a pair of rotary carrier members having mating mold cavities, means for feeding plastic sheet material to said mold cavities, means for producing suction to draw said sheets into said cavities, and means for feeding a gas producing medium into position to be inclosed by the sheets of mating cavities.

5. Apparatus for manufacturing hollow plastic articles comprising upper and lower rotary carrier members having mating mold cavities, means for feeding plastic sheet material to overlie the cavities of each member, means for producing suction within the mold cavities to shape the sheet material thereto, and means for successively feeding gas forming material into the shaped sheets carried by the lower member.

6. Apparatus for manufacturing hollow plastic articles comprising a pair of rotary members having mold cavities, means for feeding plastic sheet material to said members to overlie said cavities, means for producing suction within said cavities to shape the sheet material thereto, a hopper containing gas forming material, and means for transferring a determined amount of said material from the hopper to the cavities in the shaped sheet material of one of the members as said member rotates.

7. In combination, a pair of rotary members arranged in juxtaposition, mold sections removably carried by said members having mating mold cavities, means for feeding plastic sheet material to overlie said mold cavities, exhaust passages through the mold sections leading to the cavities, exhaust branches carried by the rotary members adapted to coöperate with the passages in the mold sections, and automatic valve mechanism for controlling said exhaust passages.

8. In combination, a pair of rotary members arranged in juxtaposition, mold sections removably carried thereby having mating mold cavities, means for feeding sheet material to overlie the cavities of each mold section, means for heating the mold sections, and means for exhausting air from the cavities of said mold sections.

9. In combination, a pair of juxtaposed wheels or drums having hollow rims, mating mold sections removably carried by said wheels and having mold cavities, means for feeding plastic sheet material to overlie the cavities of each set of mold sections, means for supplying a heating medium to said hollow rims, and means for producing suction within the mold cavities.

10. In combination, a pair of shafts geared to rotate in unison, wheels or drums fast thereon, mating mold sections carried by said wheels, said wheels having hollow rim and radial passages leading thereto, said shafts having axial passages leading from one end and communicating with said radial passages, radial suction pipes communicating with the mold cavities, said shafts having axial passages from the other end communicating with said radial pipes, vacuum and release valves carried by said pipes, stationary cam means for operating said valves, and means for feeding plastic sheet material to overlie the mating mold sections of each wheel.

11. In a machine of the character described, a wheel or drum having a peripheral fixed flange and an opposed removable flange, exhaust pipes having portions extending transversely through said fixed flange, mold sections having parts adapted to interlock with said fixed and removable flanges, said mold sections having mold cavities and passages leading therefrom adapted to communicate with said exhaust pipes, and means for securing said removable flange to said wheel.

12. Apparatus for manufacturing hollow plastic articles comprising upper and lower juxtaposed rotary carriers having mating mold cavities, one of said members having its axis located to one side of a plane passing vertically through the axis of the other, means for feeding plastic sheet material to overlie said die cavities, means for producing suction within said cavities to draw the sheet material into the same, and means for depositing a pellet of gas producing material into the sheet material on the upper surface of the lower rotary member.

In testimony whereof, I affix my signature.

JAMES W. BRUNDAGE.